United States Patent [19]
Rundle

[11] 3,831,146
[45] Aug. 20, 1974

[54] OPTIMUM SCAN ANGLE DETERMINING MEANS

[75] Inventor: Alfred T. Rundle, Endwell, N.Y.

[73] Assignee: International Business Machines Corporation, Armonk, N.Y.

[22] Filed: Mar. 19, 1973

[21] Appl. No.: 342,912

[52] U.S. Cl. ................ 340/146.3 H, 340/146.3 AH, 340/146.3 Y
[51] Int. Cl. ................ G06k 9/04
[58] Field of Search 340/146.3 H, 146.3 Y, 146.3 S, 340/146.3 AH, 146.3 AE; 235/61.11 E; 178/6.8, 7.2

[56] References Cited

UNITED STATES PATENTS

| | | | |
|---|---|---|---|
| 3,246,126 | 4/1966 | Schlieben et al. | 235/61.11 E |
| 3,292,149 | 12/1966 | Bourne | 340/146.3 H |
| 3,381,274 | 4/1968 | Quade et al. | 340/146.3 Y |
| 3,541,510 | 11/1970 | Nishioka | 340/146.3 AE |
| 3,587,047 | 6/1971 | Cutaia | 340/146.3 H |
| 3,599,149 | 8/1971 | Pardoe | 340/146.3 S |
| 3,624,606 | 11/1971 | Lefevre | 340/146.3 AE |

*Primary Examiner*—Paul J. Henon
*Assistant Examiner*—Leo H. Boudreau
*Attorney, Agent, or Firm*—Paul M. Brannen

[57] ABSTRACT

An arrangement for determining the optimum angle to scan characters for subsequent character recognition. Data from a plurality of initial or preliminary vertical scans is stored in a matrix and analyzed at the end of each scan for the angular relationship of the stored data, each representing a line segment oriented at one or another of several pre-selected angles from the horizontal. In each instance where an angle criterion is satisfied, a corresponding latch or memory device is set on. At the end of each trace, the memory devices are interrogated and corresponding counters are advanced to record the number of times the various angle measurements are met.

When a predetermined portion of the line, or the entire document, if needs be, has been scanned, the optimum angle is selected by determining which of the counters has achieved the greatest count.

10 Claims, 7 Drawing Figures

PATENTED AUG 20 1974 3,831,146

SHEET 3 OF 3

OPTIMUM SCAN ANGLE DETERMINING MEANS

FIELD OF THE INVENTION

This invention relates generally to character recognition systems, particularly for recognizing hand-written characters. More particularly the invention relates to means for determining the optimum scanning angle for scanning hand-written characters for recognition.

DESCRIPTION OF THE PRIOR ART

Character recognition systems are known in which each character is scanned at various angles, for recognition purposes. However, in the case of hand-written characters, there is no known teaching of scanning the characters to be recognized by a preliminary scan, determining the angular relationship of the characters to a datum, and subsequently scanning the characters at a related angle, for recognition purposes.

SUMMARY OF THE INVENTION

It is a principal object of the present invention to provide means for determining an optimum scanning angle for scanning characters to be recognized by a character recognition system.

A more particular object of the present invention is to provide means for controlling the scanning angle of an optical scanner to best match the angle of characters with the angle of scan.

Another object of the invention is to provide an improved means for determining at which of a plurality of angles a hand-written character should be scanned in order to optimize the recognition process.

A further object of the invention is to provide an improved means for determining an optimum scanning angle for a character recognition system in which successive ones of a plurality of preliminary scans are analyzed for line segment directional information, and this information is employed to govern the angularity of subsequent recognition scans.

Other objects of the invention and features of novelty and advantages thereof will become apparent from the detailed description to follow, taken in connection with the accompanying drawings.

In practicing the invention, a prescanning operation utilizing scan lines at 90° from the horizontal or reference line of the characters is conducted, and video data resulting from scanning the characters during this operation is stored in a two-dimensional matrix. Combinatorial logic connected to the elements of the matrix provides outputs on one or another of a plurality of angle indication lines, in accordance with the angular relationship of the substantially vertical segments in the characters which have been scanned. For each occurrence in which a particular angular relationship is determined, an associated angle counter is advanced. At the end of a predetermined interval, the outputs of the counters are compared, and the highest count determines an angle control output from the comparator which governs the angle at which subsequent recognition scans will be made.

GENERAL DESCRIPTION OF THE DRAWINGS

In the drawings, FIG. 1 is a highly schematic illustration, in block diagram form, of a character recognition system embodying the present invention;

FIGS. 2*a* and 2*b* illustrate the effects of the angle scanning correction;

FIGS. 3*a*, 3*b* and 3*c* illustrate the measurements made by the combinatorial logic to determine the proper angle correction, and FIG. 4 is a schematic illustration of one form of logic circuitry which may be used in the present invention.

DETAILED DESCRIPTION

Figure 1:
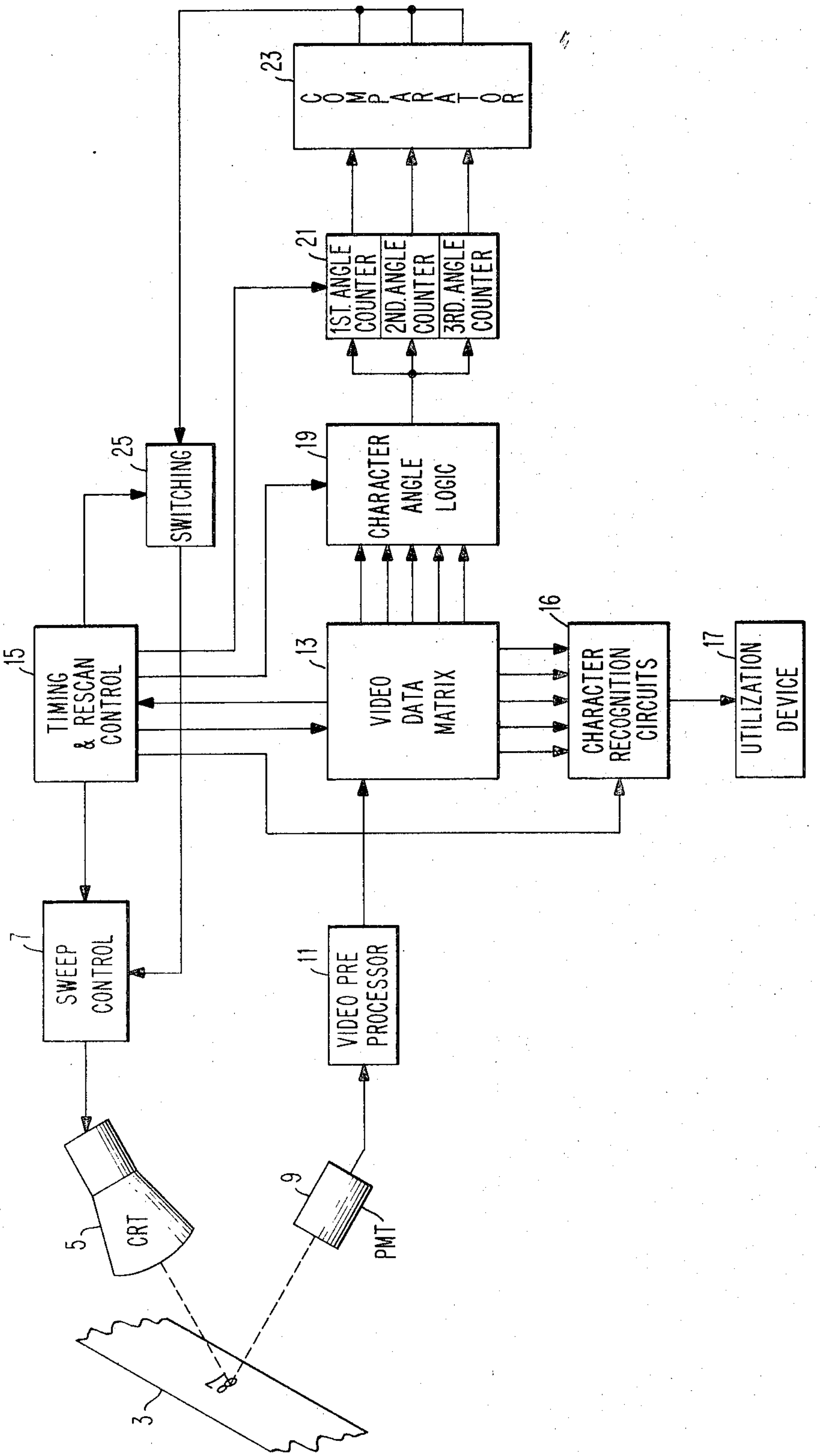

Referring to FIG. 1 of the drawings, there is shown, in schematic block diagram form, an optical character recognition system embodying the present invention.

Characters to be scanned, such as those on a document 3 are scanned by a raster generated by a cathode ray tube 5, in the well known manner of a flying spot scanner. The beam of the cathode ray tube is deflected to the desired locations under the control of sweep control circuits 7, which are arranged in the conventional manner to cause appropriate scanning action. The reflected light signals are picked up by a suitable photoresponsive device such as a photomultiplier tube 9 from whence they are supplied to conventional video preprocessing circuits 11, which amplify and shape the video signals to a digitalized form. Video signals are supplied to a video data matrix 13, and are entered therein under the control of the timing and rescan control circuitry 15, in such manner that a two-dimensional representation of the data can be considered to occur in the video data matrix as a character is being scanned. This is realized by the fact that the video data matrix comprises a large number of storage elements, to which the video data is selectively supplied, so that at the end of a scanning cycle, the pattern of video data information in the matrix 13 can be thought to comprise an electrical representation of the character which was scanned.

The matrix 13 is made up of a plurality of columns of shift registers, arranged so that the input from the video preprocessing circuits 13 is supplied at the first or topmost stage of the leftmost, or first column, in the matrix. The bottom stage of the first column is connected to the top stage in the second column, and subsequent columns are similarly connected. Accordingly, video data is serially supplied to the matrix 13 and is serially moved through the vertical columns in the matrix. Such matrix arrangements are well known in the prior art, as disclosed, for example, in U.S. Pat. No. 3,210,729, and similarly on pp. 134–140 of "Optical Character Recognition" by Fischer et al., published in 1962 by Spartan Books.

Combinatorial logic circuits designated as character recognition circuits 16 have their inputs connected to selected positions in the matrix, and when suitable combinations of presence and absence of video data in the matrix exist, then outputs are provided from the character recognition circuits, indicating the character scanned, and supplied to any suitable utilization device 17, such as a display or a printing mechanism, or the like.

The preceding description generally describes a character recognition system of the type now well known in the art, and the details have not been illustrated, since they are conventional and form no germane part of the present invention.

When the characters which are being scanned are hand written, such as hand-written numerals, it is well known that the average hand-written character usually has some degree of slope or angle with respect to horizontal reference lines, caused by the slant which most people give to their characters when generating handwritten letters or numbers. The amount of slope or angle will vary from individual to individual, ranging from almost upright, or 90° from the reference, to a relatively severe slope of 45° or 50° from the horizontal, which would be considered an extreme amount of slant or slope. Statistical studies also show that more than 95 percent of hand-written numerals slope to the right.

In the past it has been the practice to provide vertical scanning lines for scanning such characters, and reflection on the matter will show that where vertical scanning lines are employed and the letters are established at some angle to the horizontal other than 90°, there is a large possibility that the characters may have some degree of overlap when scanned by a vertical scanning beam, as well as the fact that if the logic circuits are designed to consider the idealized form of a character in an erect or 90° position within the matrix, then the recognition circuitry becomes complicated when trying to recognize characters written at an angle other than 90°.

The present invention relieves this problem considerably by providing an arrangement in which appropriate logic is arranged to examine the video data in the matrix, which is stored there during a preliminary scanning operation. Suitable character angle logic designated by reference character 19 has its inputs connected to specified locations in the video data matrix 13, and the parts are designed and arranged so that the character angle logic will examine the characters and determine essentially the angle in which the normally vertical line segments are located. The angular disposition of these segments can be grouped into two or more different categories; in the present instance, for example, three categories are chosen. A measurement logic set, comprising conventional "AND" or "OR" circuits is provided for each angular measurement or category. The inputs to each of these logic sets are connected to selected storage elements in a portion of the matrix, for example, to logic elements contained in the upper rows of the first eight columns of a matrix having 40 columns with 40 rows. It can be shown that as the video data is shifted through the matrix, portions of the video data in the selected area of the matrix will reveal the angularity of the characters by occupying, or not occupying, specific locations in this portion of the matrix. Accordingly, by suitable combinational logic circuits such angular relations can be determined. For each instance in which the logic requirements are satisfied for a particular one of the angles, a count is entered into an appropriate one of a plurality of angle counters 21, of a conventional nature, such as a cascade-connected binary counter, arranged so that additional counts are entered and held in the respective counters when the character angle logic has detected that a particular line segment falls within a particular angular range. At the end of the examination of one or more characters, the outputs of the angle counters are supplied to comparator circuits 23, which determine the angle counter having the highest count standing therein, thereby indicating the angular range in which the segments are to be found. The output of the comparator 23 is then fed back through appropriate switching circuits 25 under the control of the timing and rescan control circuits 15, to thereby set the sweep control circuitry so that the following recognition scans will be conducted at an appropriate angle as required by the previous angular measurements.

With the recognition scans being taken at an angle which is related to the angularity of the characters themselves, it will be apparent that the amount of overlap will be reduced or in many cases completely eliminated, thereby reducing the number of errors and decreasing the complexity of the recognition logic circuitry.

Figure 2A:
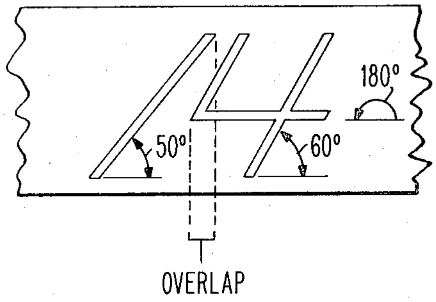
Figure 2B:
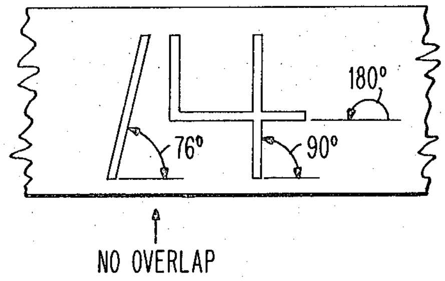

FIGS. 2*a* and 2*b* illustrate the manner in which the angle correction can eliminate the overlap between the characters. In FIG. 2*a*, the numeral 1 has been written at an angle of approximately 50°, and the numeral 4 is written at an approximate angle of 60°. It is not uncommon in such instances to find a degree of overlap, as shown, where the upper portion of the numeral 1 overlaps the lower portion of the numeral 4. It will also be apparent to those skilled in the art that such overlapping renders the segmentation or distinction between characters a difficult process.

Now in FIG. 2*a*, the angular correction has been applied and a 60° scanning angle has been employed for the recognition scan. Under these circumstances, the numerals will now appear as if the numeral 1 were written at an angle of 76° while the numeral 4 appears as though it were written at an angle of 90°, as shown in the figure. Under these circumstances, the overlap has been eliminated. Note that in the angular correction process, the horizontal line such as the horizontal stroke through the numeral 4 remain unchanged from their horizontal position.

The various angular relationships may be expressed in terms of an equation $$R = \cot^{-1} (\cot O - \cot S)$$

where $O$ = original angle of line segment, $S$ = scan angle chosen for correction, and $R$ = resultant angle of line segment, where all angles are measured counterclockwise from right-hand horizontal position. For example, if $O = 50°$, as shown in FIG. 2*a*, and $S = 60°$, which is utilized in obtaining the results shown in FIG. 2*b*, then $R = \cot^{-1} (\cot 50° - \cot 60°)$ which is approximately equal to 76°, which is the resultant apparent angle as shown in FIG. 2*b*.

Figure 3A:
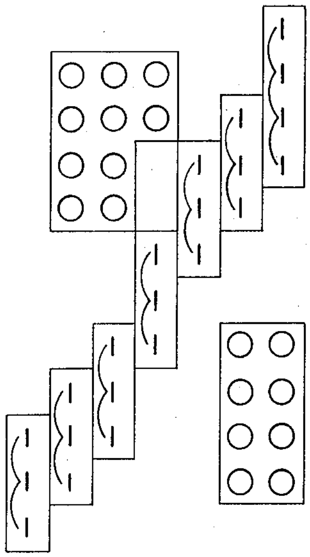
Figure 3B:
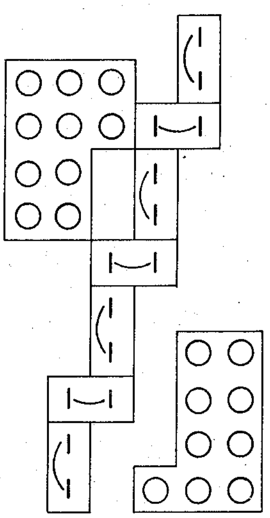
Figure 3C:
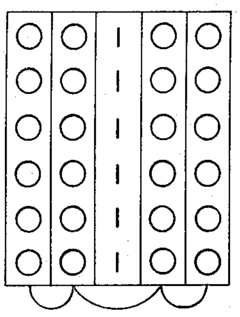

As previously indicated, the disposition of the line segments is determined by analyzing the position of black and white areas representing the locations of video data in the upper left corner portion of the storage matrix. Three possible patterns are illustrated in FIGS. 3*a*, 3*b* and 3*c*. In these figures, the spaces indicated by a 1 represent black areas, while the spaces represented by 0 indicate white areas. It will be noticed, for example, in FIG. 3*a* that seven columnar locations are examined for black information. For instance, in the uppermost right-hand location, four possible storage locations have their outputs connected together in an OR fashion, so that the presence of a black bit in any one of these will provide an output for that particular column. Seven columns in all are provided in an arrangement which is in descending fashion to the left as shown. The outputs from these columns are ANDed together and must be combined with an indication that the lower right-hand portion has all white and the upper left-hand portion has at least not all black data therein. If these requirements are satisfied, then the output of the particular measurement circuit will be enabled to indicate that the line segments fell within a range of 50° to 65° from the horizontal.

Similar measurements are illustrated for line segments falling between 65° and 75° from the horizontal and a measurement indicating that the line segment is at an angle 90° from the horizontal. The detailed circuits for providing these logical combinations are not shown, since they are quite conventional and would be readily apparent to anyone skilled in the art.

Figure 4:
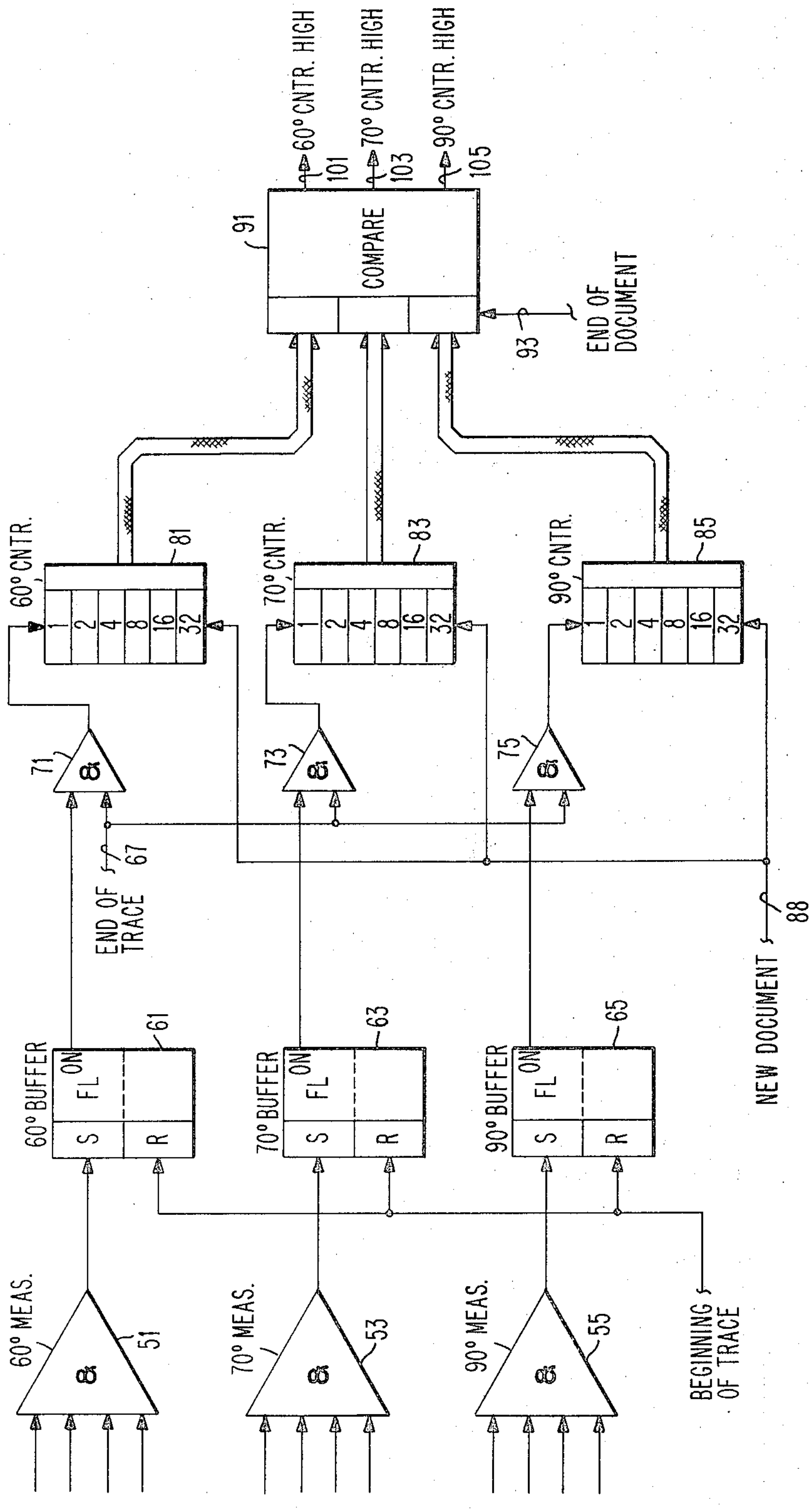

Referring to FIG. 4, there is shown in more detail the manner in which the angular measurement accumulation is stored and evaluated to provide an appropriate control for adjusting the angle of scan on the subsequent recognition scan cycle.

The combinatorial logic networks utilized for determining the angular position of the line segments are indicated symbolically by the three logic elements 51, 53 and 55, being designated for the 60° measurement, the 70° measurement and the 90° measurement, respectively The outputs of these elements are supplied to the set side of a corresponding set of latches 61, 63 and 65, these latches being reset by the beginning of the trace or scan line. During the trace or scan line in which the flying spot scanner scans the document area once, if any one of the logic conditions is fulfilled, the corresponding buffer latch will be set to its on condition. At the end of a scan line trace, an end of trace signal is supplied on a line 67 to one input of a plurality of AND circuits 71, 73, and 75, the other inputs of these AND circuits being connected to the outputs of the latches 61, 63 and 65, respectively.

Accordingly, at the end of each scan line or trace, the angle storage latches are sampled and if any one or more are on, a respective count is entered into one of three corresponding counters, 81, 83 and 85. These counters have a predetermined capacity and may be of any known construction, such as a binary form illustrated herein as having six positions. The counters are initially in a reset state as provided by a reset signal supplied over a line 88 when each new document is presented to the scanning apparatus.

From the foregoing, it will be apparent that counts will be accumulated in the angle information counters during the prescanning operation, and these counters will indicate the number of times that the angular measurement criteria have been satisfied. The outputs of the counters are supplied to a compare circuit 91, by a sampling signal on the line 93, which occurs at the end of a document. Thus when the document has been scanned completely during the preliminary scanning operation, the counts standing in the respective angle counters will be compared by the compare unit 91, and outputs will be provided on a plurality of output lines 101, 103 and 105, which indicate which of the respective counters has reached the highest count, thereby satisfying the angular measurement criteria the greatest number of times. These outputs are supplied then to the raster or beam control circuitry to alter the angle of scanning as described previously so that the angle scanning more closely matches the angle at which the characters have been written.

From the foregoing, it will be apparent that the present invention provides a novel and improved method of determining the angular range within which the segments of characters are aligned, so that the angle of scanning of the characters may be subsequently arranged or selected to most closely match the angle of the line segments, thereby reducing problems in segmentation and overlap.

While the invention has been particularly shown and described with reference to a preferred embodiment thereof, it will be understood by those skilled in the art that various changes in form and details may be made therein without departing from the spirit and scope of the invention.

I claim:

1. In a character recognition system, the combination comprising scanning means for scanning characters to be recognized with a selected one of a plurality of scanning patterns, each said pattern having a predetermined angular relationship to a reference datum, and comprising a rectangular raster of parallel scan lines, storage means connected to said scanning means for receiving and storing scanning data from said scanning means, logic means connected to said storage means for producing angle output signals indicative of the angle of predominant line segments in the characters scanned, and scanner control means connected to said logic means and said scanning means for selecting an optimum one of said scanning patterns in accordance with the angle of the predominant line segments of the character to be scanned.

2. The combination as claimed in claim 1, further characterized by said storage means comprising an array of storage elements, and said logic means comprising a plurality of combinatorial logic devices connected to selected ones of said elements.

3. The combination as claimed in claim 1, further characterized by said logic including a plurality of angle counters, one for each class of angle output signals, and means for determining the counter having the greatest count after a predetermined number of preliminary scans by said scanning means.

4. The combination as claimed in claim 3, further including comparing means connected to the outputs of said counter means for determining which of the counters has the highest count.

5. The combination as claimed in claim 1, in which said scanning means comprises a flying spot scanner and a photoresponsive element.

6. The combination as claimed in claim 5 in which said flying spot scanner includes beam control means effective to cause the scanner to execute scanning rasters at selected angles from a reference datum.

7. The combination as claimed in claim 1 in which said reference datum is a line substantially parallel to a line of characters to be scanned.

8. The combination as claimed in claim 1, in which said logic means comprises a plurality of combinational logic circuits connected to predetermined portions of said storage means to provide angle output signals as the scanning data is supplied to said storage means during a preliminary scan in which the parallel scan lines are at 90 degrees from a reference datum comprising a line substantially parallel to a line of characters to be scanned, one of said plurality of networks for each of a corresponding plurality of angles for predominant line segments of the character to be scanned.

9. The combination as claimed in claim 8, further including accumulating means for determining which of said networks provides the greatest number of angle output signals during the scanning of a character.

10. The combination as claimed in claim 9, further comprising beam control means governed by said accumulating means to control the scanning means to execute at least one subsequent scanning raster at an angle determined in accordance with the angle of the predominant line segments of the character to be scanned.

* * * * *